May 12, 1964     T. COLLINS ETAL     3,132,604
CONVEYANCE CONSTRUCTION
Filed Dec. 7, 1960                                    2 Sheets-Sheet 1

INVENTORS
TAPPAN COLLINS
PETER T. GACS

BY *Shanley & O'Neil*

ATTORNEYS

INVENTORS
TAPPAN COLLINS
PETER T. GACS

BY Shanley & O'Neil.

ATTORNEYS

United States Patent Office 3,132,604
Patented May 12, 1964

3,132,604
CONVEYANCE CONSTRUCTION
Tappan Collins, Prairieton, Ind., and Peter T. Gacs, Los Angeles, Calif., assignors to National Steel Corporation, a corporation of Delaware
Filed Dec. 7, 1960, Ser. No. 74,398
10 Claims. (Cl. 105—422)

The present invention relates generaly to freight carrying conveyances and more particularly to the structure of the flooring of such conveyances.

For many years, in freight conveyances such as railway rolling stock, all-steel freight cars of the open top variety had been used provided with floors comprised of steel plates fastened together. These "gondola" cars, as they are called, were fairly satisfactory for the transportation of freight of a loose nature such as coal, grain, iron ore, pig iron, or steel scrap or the like. Loose freight could simply be dumped into the car and transported without securement of any kind, the steel floor providing underlying support for the freight and nothing more.

However, for those types of lading which needed to be immobilized with respect to the freight car for satisfactory transportation and those which needed "floating" or restrained connection with the car, wooden freight car floors had long been the only practical solution in both open top and box cars. In order to immobilize freight or to set it up in floating relation to such wooden flooring of freight cars, various blocking arrangements were used. Heavy wooden blocking was placed in a position on the car floor where it would abut against the proper part of the lading and this heavy blocking was nailed in this position to the wooden floor with heavy nails. When the freight reached its destination, the blocking was ripped up in order to remove the freight from the car.

The old steel plate floors, which obviously could not be used in connection with blocking, had fairly long life. On the other hand, wood car floors did not. The impact forces of loading and unloading using heavy clamshell buckets and magnets in open top cars and the fork trucks used for loading and unloading box cars soon ruined the wooden flooring. Moreover, wooden flooring continuously used for blocking freight deteriorated rapidly due to weakening by the numerous nail holes.

Thus, the railroads were obliged to buy two kinds of cars, steel floor and wood floor. But this initial double expense was not the only disadvantage, as the steel cars and wood cars often ran empty. For example, in the steel industry, pig iron and scrap steel came into the plants in the old steel bottom cars and the finished product packaged to prevent damage in transportation went out in wooden bottom cars. Most of the time the wooden bottom cars came in empty and the steel bottom cars went out empty because neither type of car alone could handle both types of freight.

In an effort to provide a single all-purpose, stronger freight car flooring, it was proposed quite some time ago to provide steel flooring having inserts comprising wooden nailing strips, as in U.S. Patents Nos. 986,422 of 1911 and 2,056,137 of 1936, in the hope of combining the strength of steel with the nailability of wood. However, in spite of the great additional expense involved, this solution has not been satisfactory because the nail holes were concentrated in the inserted strips with the result that the wood broke up and deteriorated very rapidly. Furthermore, all attempted combinations of wood and steel have resulted in inordinate steel corrosion, possibly because the wood retains moisture and holds it in contact with steel surfaces.

In recent years, an all-metal flooring has been developed which is strong and has good nailing properties. This flooring is described in U.S. Patent No. 2,667,243 and comprises metal structural members arranged side-by-side to form the flooring of a freight conveyance. These structural members as illustrated in that patent have reinforcing webs along their opposite sides and one web is provided with a male corrugation while the other web is provided with a complementary female corrugation. When the structural members are arranged side-by-side, the male and female corrugated members are in opposed spaced apart relationship to define therebetween a sinuous groove into which nails can be driven and gripped.

This recent metal flooring has been a vast improvement over any freight car flooring known theretofore. Nevertheless, it has been susceptible to various improvements to strengthen it and render it cheaper and easier to manufacture, and the present invention embodies several such improvements.

Accordingly, it is an object of the present invention to provide a conveyance flooring adapted to receive and retain nails, having improved strength characteristics under static or shock loads applied normal to the plane of the freight-engaging surface of the flooring.

Another object of the present invention is the provision of flooring for freight conveyances, adapted to receive and retain nails, which has high strength per unit of cross-sectional area, thereby to enable the use of lighter and less expensive flooring than in the past.

The invention also contemplates all-metallic flooring for freight conveyances, adapted to receive and retain nails within nailing slots having novel provision for retaining the nails within the slots.

Finally, it is an object of the present invention to provide freight conveyance flooring which will be easy and inexpensive to manufacture and install and rugged and durable in use.

Other objects and advantages of the present invention will become apparent from a consideration of the following description, taken in connection with the accompanying drawings, in which.

Figure 1:
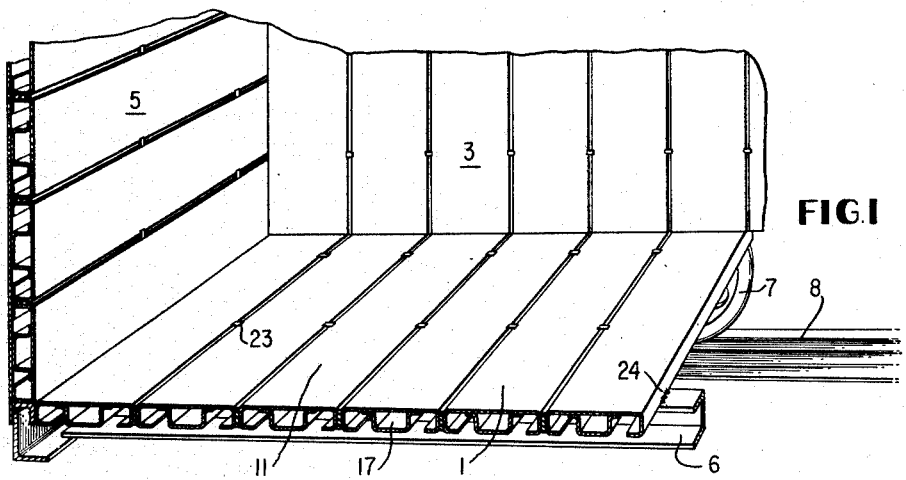
FIGURE 1 is a fragmentary perspective view of the interior of a lower corner of conveyance construction according to the present invention as embodied for example in a railway freight car.

Although the present invention is illustrated and will hereinafter be described in connection with railway rolling stock, it will be appreciated that it is susceptible of embodiment in conveyances of other types such as motor trucks, ships and the like. Although the illustrated embodiment indicates the use of an integral hot or cold rolled sheet metal structural member in the combination of the invention, the metallic member can be in the form of an extrusion or can be built up of component parts.

Referring now to the drawings in greater detail, there is shown in FIGURES 1–4 a first embodiment of the present invention, in the form of railway rolling stock comprising a conventional freight car of open top or box car type having a novel floor construction 1, side wall construction 3 and end wall construction 5. Side walls 3 are considerably longer than end walls 5, so that the freight car, as is usual, is elongated in its direction of travel. Supporting structure for the floor is provided comprising an underframe or floor supporting structure including frame members 6 running lengthwise of the car. The freight car rolls on the usual wheels 7 on railroad tracks 8.

The floor carried above this conveying supporting structure comprises a plurality of long, narrow contiguous metallic structural members 9 arranged side-by-side and extending across the car transversely of the length of the car and supported on frame members 6. In order to provide a floor to withstand the hard usage to which it will be subjected in a freight conveyance such as a freight car, the structural members 9 are preferably formed of steel. Each member 9 has a flat panel 11 on the upper side of the floor, and each flat panel 11 has a uniplanar freight-engaging face directed away from the conveying supporting structure, the freight-engaging faces of the plurality of structural members 9 being arranged at a uniform level to provide a uniplanar freight-engaging surface of the floor.

Each of structural members 9 has a pair of downwardly extending side reinforcing webs 13 joined to the side edges of panel 11 through fillets of metal 14, the webs and fillets extending longitudinally of the panel. Flanges 15 extend laterally from the edges of the side reinforcing webs remote from panel 11 to provide reinforcement and seating surfaces for seating on the frame members 6 or other supporting structure of the conveyance. Fillets 16 join webs 13 and flanges 15. Fillets 14 and 16 preferably have as small a radius of curvature as possible consistent with a satisfactory conditions of the metal of the fillet where cold forming or hot rolling is used. Where the metal is extruded the external corners at the fillets are as close to 90° as practicable. The flooring is integrated with the conveying supporting structure by means of welds (not shown) by which at least some of flanges 15 are secured to frame members 6, or by means of riveting or bolting or the like. Webs 13 are disposed in parallel planes perpendicular to the plane of panel 11 and have outer surfaces which are also arranged in this fashion. The two flanges 15 of each structural member 9 extend toward each other and are coplanar, the common plane of these two flanges being parallel to the plane of panel 11 and perpendicular to the two parallel planes of webs 13. A hat-shaped rib 17 extends lengthwise of the mid-portion of and is secured to the underside of panel 11 as by welding or the like for reinforcement purposes.

The opposed flat surfaces of webs 13 of adjacent structural members 9 are parallel and vertical and are spaced apart about a quarter of an inch. Unlike other types of metallic flooring adapted to receive nails, however, webs 13 do not deform the nails, for the nails pass between the opposed surfaces of webs 13 without necessarily making mutual contact with both those surfaces.

Between opposed adjacent webs 13 is a body of solid elastic deformable material 19 of an elasticity such that nails may be driven therein and may displace material 19 laterally, but such that when the nails are withdrawn, material 19 will recover substantially its original position, save for the presence of a rupture along what was formerly the axis of the nail. It is not necessary that material 19 be self-sealing in the sense that the rupture left by the nail completely heals; on the other hand, most of the area occupied by the nail should be reoccupied by material 19 upon removal of the nail. Preferably, the hole left by the nail should be substantially completely reoccupied by the material upon withdrawal of the nail. Suitable materials are woven fiber belting impregnated with rubber or other fibrous materials impregnated with rubber or rubbery plastic, or, in general, a solid elastic deformable material, preferably in the form of an impregnant or binder for a woven or random filament fibrous filler and reinforcing material. The filaments of the fibrous filler should have considerable strength and length. Particularly preferred at the present time is a material like conventional belting of woven cotton duck impregnated with rubber. One of the many suitable forms is belting material about 1½" wide by about ¼" thick with neoprene coated square edges, made up of four plies of 28 to 36 oz. cotton duck fabric body, rubber impregnated, with rubber skim coats between the plies for ply adhesion and a rubber skim coat on both flat surfaces. In the embodiment of FIGURES 1–4, material 19 is provided with a layer 20 of neoprene along its upper edge to protect the material from the harmful effects of contact with oil and gasolene and other substances that tend to soften or destroy material 19.

Material 19 is secured to both of the adjacent opposed faces of webs 13, and in the embodiment of FIGURES 1–4, adhesive 21 at both of the interfaces between material 19 and webs 13 serves as means bonding both adjacent surfaces of material 19 to the adjacent faces of webs 13. Adhesive 21 may for example be in the form of any suitable adhesive or cement. Any of the epoxy resins useful in bonding rubber ot metal can be used. It is contemplated that where the members are hot formed or subjected to heat treatment the residual heat may be utilized to cure a thermosetting form of cement. In such case a plurality of the structural members would be assembled into a panel in the steel plant after hot forming or heat treatment.

The body of material 19 is several times greater in height than in width and extends at least through that portion of the length of the adjacent members 9 which is exposed in the car floor. The body of material 19 is preferably formed of a single unit but may be made up of a number of separate pieces of material 19 disposed in end-to-end contact along the length of the groove.

Bridge welds 23 at widely spaced locations on the freight conveying surface of the flooring and the bottom of the nailing slots integrate the tops and bottoms of structural members 9 across the tops and bottoms of the nailing slots between adjacent webs 13, thereby to prevent the webs 13 from pulling away from each other. Welds 24 attach at least some of the structural members to car frame members 7 to hold the entire floor in place and in addition to cause the integrated floor to act as a reinforcement for the car frame. When the car floor is built up of single structural members, each member may be attached in this or similar manner to the car frame. Where the car floor is built up from panels which in turn are formed of a plurality of preassembled structural members, not all of the structural members have to be welded to the car frame.

Figure 2:
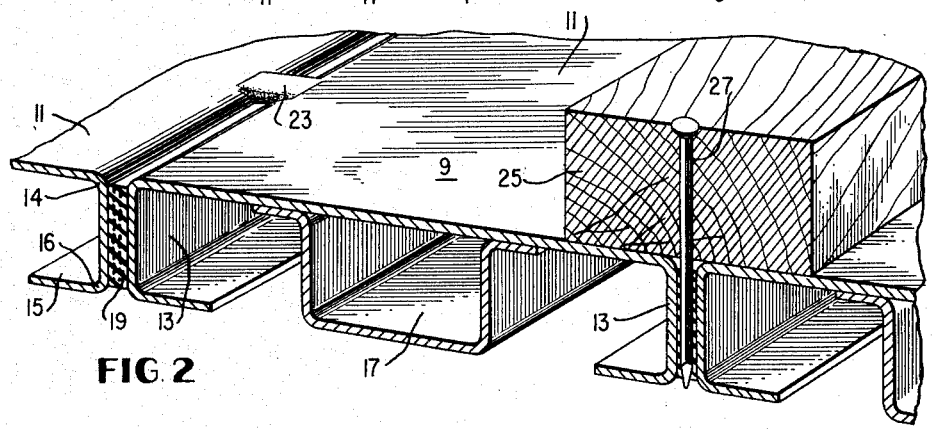
FIGURE 2 is an enlarged fragmentary perspective view of the flooring of FIGURE 1.
Figure 3:
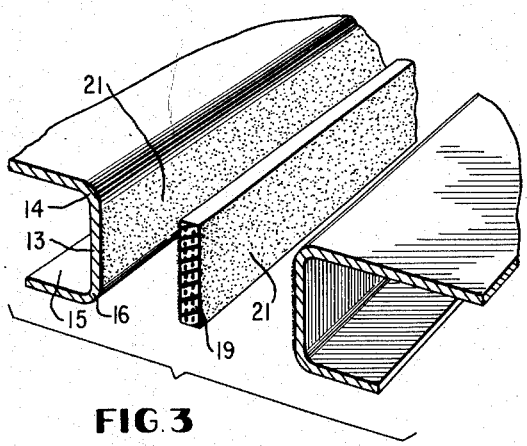
FIGURE 3 is a fragmentary perspective exploded assembly view of freight car flooring according to the present invention showing the shape and manner of securement of the material between the flooring member webs.
Figure 4:
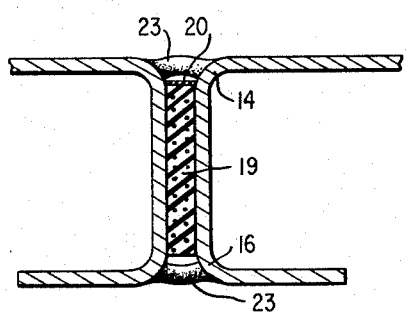
FIGURE 4 is an enlarged fragmentary cross-sectional view of the structure at a nailing slot according to the present invention.

The manner of use of the novel flooring according to the present invention is also indicated in FIGURE 2, in which a piece of timber 25 is shown secured to the metallic floor by means of a nail 27 passing through timber 25 and into the nailing slot between webs 13. The timber in turn serves as a stop to prevent certain classes of freight from shifting about in the car.

Various important features of the present invention should now be noted. In the first place, it is important to note that the nails are not driven into the elastic material as into an unconfined block of rubber. Instead, the nails are quite close to both of the opposed surfaces of the webs that define the nailing slot. In particular, the diameter of the nail is not less than about half the width of the slot, preferably about 65% to about 85% of the width of the slot. If the nail is too wide, that is, about the same diameter as the width of the slot, then the nail passes so close to both opposed surfaces of the webs defining the slot that the nail cannot make a passageway for itslf merely by resiliently compressing or displacing the material 19. Instead, when the nail is too big, material 19 is cut or torn away from the webs at the region where the sides of the nail contact the webs.

On the other hand, if the slot is too wide relative to the diameter of the nail, then material 19 acts as a spring and yields under the blows of the hammer attempting to drive the nail into the elastic material. Thus, when the slot is of proper size relative to the nail, the material 19 is relatively easily sheared by the nail to produce a line of rupture axially of the nail; but when the slot is too wide, then rupture of the material is greatly resisted by material 19 acting as a rubber spring.

In actual practice the size of the nails and hence the minimum width of the slot are determined by the conditions that obtain during the blocking of the freight. In blocking freight, it is the practice to use blocks of hardwood such as oak, in various standard sizes such as 2″ x 4″ and the like. The length of the nail is determined by the thickness of the block it passes through so as to leave a reasonable length of nail within the nailing slot to be gripped by material 19. The length of a conventional nail, in turn, largely predetermines its diameter. In the blocking of lading in freight cars and other conveyances, the three most commonly used sizes of nail are 16d, 20d and 30d. These nails have diameters of 0.16″, 0.192″ and 0.207″, respectively. Smaller than these sizes, too many nails have to be driven to secure the blocking; and larger than these sizes, the nails are of such diameter that an ordinary workman has trouble driving them through hardwood with a hand hammer. Considering the manufacturing tolerances of the largest size of nail commonly used and the manufacturing and installation tolerances of the flooring of the present invention, and taking into account the fact that there should always be some clearance between the nail and the adjacent webs, a nailing slot of about ¼″ width is preferred. Nevertheless, it is possible to use ⅓″ slot or even up to about ½″ slot. The use of larger slots, however, would inevitably be attended by increased cost of the filling material.

Increased width of nailing slot is also undesirable from a standpoint of the manner in which the horizontal stresses applied to the blocking are transmitted to the flooring. In the conveyances of the present invention, the nailing slots extend transverse to the lengthwise extent of the conveyance, that is, transverse to the direction of movement of of the conveyance. This means that the horizontal shock and static loads applied to the blocking and transmitted to the flooring are applied largely lengthwise of the conveyance. The present invention, by disposing the nailing slots transverse to the direction of horizontal loading, and by positioning the side walls of the webs closely adjacent the sides of the nails, assures that the strongest horizontal gripping force of the elastic material will be applied to the nail on the sides of the nail adjacent the webs, that is, on the sides of the nail which bear the major horizontal loads. The closely spaced webs, acting on the elastic material 19, thus restrain the nail against movement fore and aft of the car, transversely of the nailing slot.

Finally, in connection with the embodiment of FIGURES 1-4, it should be noted that the fibers and the rubber coact uniquely together in the environment of the present invention in that the high tensile strength fibers greatly limit the size of the rupture produced by the nail while the rubber imparts a high starting friction and a degree of elasticity that the fibers alone could not supply. The nail shears its way through the rubber, fighting its way past but not shearing, the fibers. The fibers act to hold the rubber together and assist in the self-healing action when the nail is withdrawn.

It will therefore be apparent that the mechanical properties of material 19 are quite important. The modulus of elasticity should be above about 5,000 p.s.i. and not substantially greater than about 100,000, preferably about 10,000–30,000. The tensile strength of material 19 is preferably about 8,000–16,000 p.s.i.

A mastic material, not shown, may be used to close the slots above elastic material 19 to form a smoother floor but with or without such mastic filler the floor can be considered uniplanar for all practical purposes. Also, the floor of the car may be coated with anti-skid material without altering any of the essential relationships of the invention.

Figure 5:
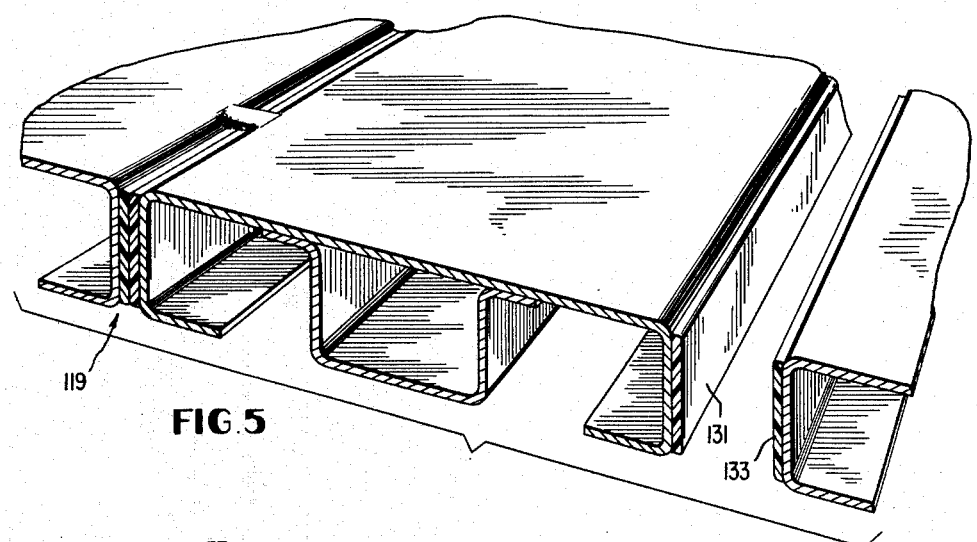
FIGURE 5 is a partly exploded fragmentary perspective assembly view of a modified form of the present invention.
Figure 6:
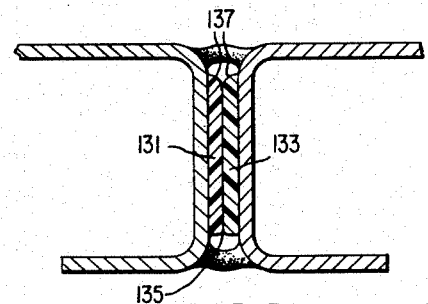
FIGURE 6 is a view similar to FIGURE 4 but showing the modification of FIGURE 5.
Figure 7:
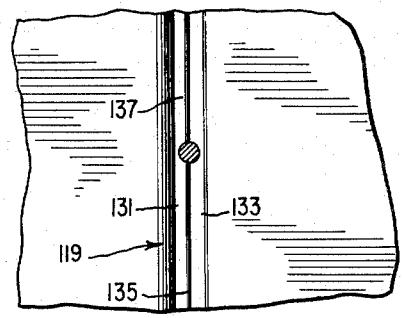
FIGURE 7 is a plan view of the structure of FIGURE 6 and showing a nail shank.

A modified form of structure according to the present invention is shown in FIGURES 5–7. In this embodiment, the elastic deformable solid material, indicated generally at 119, differs from the previous embodiment in that it is relatively harder and in the form of a pair of strips 131 and 133, one intimately bonded in any suitable manner to each of the opposed outer web surfaces of a pair of adjacent members 9. Strips 131 and 133 meet in an interface 135 parallel to each of the adjacent opposed web faces. In the embodiment of FIGURES 5–7, the nails are guided along the cleavage formed by interface 135 by the valley formed by rounded edges 137 on the strips 131 and 133 and do not rupture either of strips 131 and 133. Instead, the nails confine themselves to displacing the material of strips 131 and 133 laterally thereby causing the material to grip the nail in a tight frictional grip.

The difference is mode of action of the embodiments of elastic deformable material 19 and 119 in the two species described thus far enables the use of different materials in these two embodiments if desired. In the first embodiment, the need to penetrate the material by producing a sheared line with the nail makes it desirable to utilize an elastic material having a relatively low modulus of elasticity and to reinforce the material with high tensile strength fibers so as to prevent undue displacement of the material axially of the nail and also to prevent the nail from breaking off pieces of the material. However, the embodiment of FIGURES 5–7, in which the nail does not rupture the material but is driven in between two pieces of the material, enables the use of elastic deformable material having a much higher modulus of elasticity. Examples of suitable materials 119 are relatively hard solid rubber and various elastic deformable plastic materials of relatively high modulus of elasticity in molded or extruded form, such as nylon, polyethylene and the like. Of course, if desired, fiber-reinforced materials can be used in the embodiment of FIGURES 5–7. In either case the material should be capable of being strained up to 90% with substantially complete recovery.

For the embodiment of FIGURES 5–7, it is preferred that the compressive strength of material 119 at upper yield or 1% offset be about 7,000–13,000 p.s.i., and that the modulus of elasticity be about 40,000–400,000 p.s.i.

It should be noted that the same basic principle interrelates both of the two embodiments described thus far, and that they differ basically only with regard to the fact that in the latter modification what would otherwise be the line of rupture along the axis of the nail has already been provided in the form of a plane of cleavage preformed in the material between the webs. Thus facilitating penetration the nail enables the use of a tougher, harder form of elastic deformable material with resulting better nail gripping characteristics and longer life.

Figure 8:
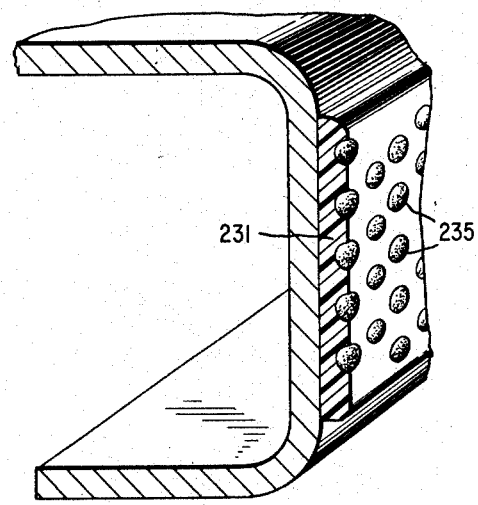
FIGURE 8 is an enlarged fragmentary cross-sectional view of a portion of a flooring member according to the present invention showing still another modification of the present invention.
Figure 9:
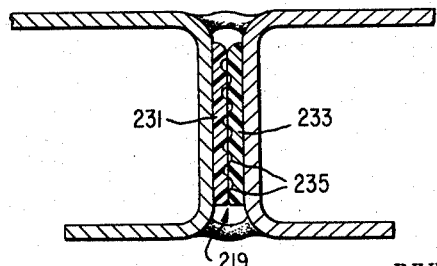
FIGURE 9 is a view similar to FIGURES 4 and 6 but showing the embodiment of FIGURE 8.

FIGURES 8 and 9 show a still further embodiment of the present invention, in which an elastic deformable element, indicated generally at 219, of still higher modulus of elasticity can be used. This is made possible by incorporation in strips 231, 233, which are similar to strips 131, 133, of perforations, pocks, grooves, or any other suitable cavities of regular or irregular conformation.

The cavities, which are shown as pocks 235 in FIGURES 8 and 9, can extend to any suitable depth in the material of the strips and their major purpose is to provide space into which material of the strip can escape when the material is deformed by a nail. In this manner a material can be utilized which is not as elastic as that of the solid strips 131, 133. In some instances a higher starting friction can also be achieved in this manner due to the character of the surface of the material in contact with the nail.

The same considerations of nailing groove width apply to the embodiments of FIGURES 5–9 as apply to the embodiment of FIGURES 1–4.

Moreover, the relationship between the webs and the material in the nailing grooves must also be emphasized. Whenever downwardly directed forces are imposed on the flooring of the present invention, in whichever of the illustrated or non-illustrated embodiments it may take, the webs on opposite sides of the material filling the nailing groove tend to bow toward each each. This is because a couple is present between forces acting parallel to the plane of the webs and forces directed at angles to the planes of the webs and acting through the fillets by which the webs are joined to the horizontal portions of the flooring, or between the forces in the webs and the forces in the horizontal portions themselves. Specifically, any downwardly directed load on the nailing groove or adjacent portions of the flooring causes vertically directed compressive stresses in the web and also forces in other portions of the flooring disposed at an angle to these web forces, the resultant of these non-coincident forces in effect urging the webs toward each other. Stated another way, the webs behave as though subjected to vertical forces applied to the side of each web opposite its neighboring web across the nailing groove. This tendency to set up a couple the resultant of which acts to bow the webs toward each other is of course strongest in cold formed members such as those illustrated in the drawing, in which rounded fillets are necessarily present. The same tendency, however, but in a lesser degree, is also present in extruded or other hot formed members having no fillets by virtue of the asymmetrical design of the web and the attached horizontal portions of the member.

Therefore, it is obvious that in the present invention the presence of the material filling the nailing groove is quite important as this material acts to strengthen the member by resisting the tendency of the webs to bow toward each other. In general, when the material has a relatively low modulus of elasticity, as in the case of rubber-impregnated fiber, a narrower nailing groove is more desirable; while in the case of less readily deformable materials such as nylon, a wider nailing groove can be tolerated. Movement of the webs toward each other, however, can be permitted up to the elastic limit of the material of the webs. In the present invention, therefore, much greater loads can be borne without permanent deformation of the flooring by virtue of the presence of elastic material in the nailing groove.

Stated another way, the filled nailing groove of the present invention enables the use of lighter gage, less expensive metal flooring than had heretofore been possible. For example, it has been found that the gage of sheet metal from which flooring is cold rolled can be reduced around 15% without decreasing the strength of the flooring as compared to older and heavier constructions.

From a consideration of the foregoing description, it will be obvious that all of the initially recited objects of the present invention have been achieved.

The terms "floor" and "flooring" as used in the appended claims embrace within their meanings those of the terms "wall" and "walls."

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A construction for use as a freight conveyance floor construction, comprising a plurality of elongated structural members, each structural member having a uniplanar freight-engaging face, the freight-engaging faces of the plurality of sructural members being arranged at a uniform level to provide a uniplane freight-engaging floor surface, each structural member having rigid surfaces at either side thereof extending laterally away from the freight-engaging face, means rigidly securing the structural members together in adjacent side-by-side relation with the rigid laterally extending surfaces of adjacent structural members opposed and contiguous to form a nail-receiving slot therebetween, the opposed rigid surfaces being disposed on opposite sides of a pair of spaced parallel planes that are perpendicular to the freight-engaging floor surface, thereby to define a slot of a width and of an orientation relative to the freight-engaging floor surface such as to permit a nail to be driven into the slot without deformation of the nail, and solid elastic nail-gripping material which is at least predominantly a plastic material and which has a modulus of elasticity in the range of about 5,000 to 400,000 p.s.i. disposed in the slot and extending a substantial distance away from the freight-engaging floor surface with the opposed rigid surfaces and associated nail-gripping material coatcing to restain the opposed rigid surfaces against extreme movement toward each other and to confine the nail-gripping material against expansion in a direction normal to the opposed rigid surfaces.

2. A construction as claimed in claim 1, the opposed rigid surfaces being flat and parallel to each other and perpendicular to the freight-engaging floor surface.

3. A construction as claimed in claim 2, the nail-gripping material having a height several times the width of the slot.

4. A construction as claimed in claim 2, said opposed rigid surfaces being spaced apart not less than about ¼ inch and not more than about ½ inch.

5. A construction as claimed in claim 2, the edge of the nail-gripping material remote from the freight-engaging floor surface being unconfined.

6. A construction as claimed in claim 2, the plastic material being rubber.

7. A construction as claimed in claim 2, and means bonding the nail-gripping material to the opposed rigid surfaces.

8. A construction as claimed in claim 2, the nail-gripping material comprising a strip of fibers impregnated with plastic material.

9. A construction as claimed in claim 2, the nail-gripping material extending lengthwise at least a major portion of the length of the slot.

10. Railway rolling stock comprising a freight car elongated in its direction of travel and having conveying supporting structure and a floor construction carried thereby to which blocking can be nailed for preventing shifting of freight in transit, the floor construction comprising a plurality of elongated structural members arranged in adjacent side-by-side relation transverse to the length of the freight car, each structural member having a uniplanar freight-engaging face directed away from the conveying supporting structure, the freight-engaging faces of the plurality of structural members being arranged at a uniform level to provide a uniplanar freight-engaging floor surface, the structural members having rigid surfaces at either side thereof extending laterally from adjacent the freight-engaging faces toward the conveying supporting structure, means including rigid connection between the structural members and the conveying supporting structure integrating the floor construction and conveying supporting structure and holding the structural members in side-by-side relation in the freight car with the opposed rigid laterally extending surfaces of adjacent structural members contiguous to form a nail receiving slot therebetween transverse to the length of the freight car, the opposed rigid surfaces being disposed on opposite sides of a pair of spaced parallel planes that are perpendicular to the freight-engaging floor surface thereby to define a slot of a width and of an orientation relative to the freight-engaging floor surface such as to permit a nail to be driven into the slot without deformation of the nail, and solid elastic nail-gripping material which is at least predominantly a plastic material and which has a modulus of elasticity in the range of about 5,000 to 400,000 p.s.i. disposed in the slot and extending a substantial distance away from the freight-engaging floor surface with the opposed rigid surfaces and associated nail-gripping material coacting to restrain the opposed rigid surfaces against extreme movement toward each other and to confine the nail-gripping material against expansion in a direction normal to the opposed rigid surfaces.

References Cited in the file of this patent
UNITED STATES PATENTS

| | | |
|---|---|---|
| 1,916,461 | Bronson | Juy 4, 1933 |
| 2,106,390 | Crane | Jan. 25, 1938 |
| 2,142,320 | Lundvall | Jan. 3, 1939 |
| 2,186,567 | Arnold | Jan. 9, 1940 |
| 2,388,968 | Hedgren | Nov. 13, 1945 |
| 2,739,543 | Candlin | Mar. 27, 1956 |
| 2,794,403 | Stein | June 4, 1957 |
| 2,907,417 | Doerr | Oct. 6, 1959 |
| 2,942,701 | Pope | June 28, 1960 |

UNITED STATES PATENT OFFICE
CERTIFICATE OF CORRECTION

Patent No. 3,132,604                                May 12, 1964

Tappan Collins et al.

It is hereby certified that error appears in the above numbered patent requiring correction and that the said Letters Patent should read as corrected below.

Column 4, line 31, for "ot" read -- to --; column 5, line 5, for "itslf" read -- itself --; line 31, for "0.16" read -- 0.162 --; line 51, strike out "of", second occurrence; column 6, line 33, for "is" read -- in --; column 7, line 20, for "each", second occurrence, read -- other --; column 8, line 11, for "sructural" read -- structural --; line 12, for "uniplane" read -- uniplanar --.

Signed and sealed this 22nd day of September 1964.

(SEAL)
Attest:

ERNEST W. SWIDER
Attesting Officer

EDWARD J. BRENNER
Commissioner of Patents